Patented Sept. 18, 1951

2,568,209

UNITED STATES PATENT OFFICE 2,568,209

OXYGEN-BF$_3$-HYDROCARBON COMPLEX CATALYST

Richard C. Wackher, La Grange, and Carl B. Linn, Riverside, Ill., assignors to Universal Oil Products Company, Chicago, Ill., a corporation of Delaware No Drawing. Original application October 31, 1945, Serial No. 625,949. Divided and this application June 15, 1949, Serial No. 99,368

10 Claims. (Cl. 252—429)

This application is a division of our application Serial No. 625,949, filed October 31, 1945, now U. S. 2,488,752.

This invention relates to novel compositions, which are useful as catalysts in various types of organic reactions, particularly those reactions involving the conversion of hydrocarbons, and to methods for the preparation thereof.

The benefits derived from the use of catalysts in organic reactions are recognized by those familiar with the art. For example, many of the present commercial processes such as the polymerization of normally gaseous olefins to high octane number motor fuels probably would not be feasible without the use of substances which influence the rate and direction of the reactions. Despite the general usefulness of these processes, many of them are handicapped by the high initial cost of the catalyst, which cost is due to the expensive reagents and the complex operations required in the manufacture thereof. This factor of cost is often intensified by the need for frequent replacement of the catalyst because of the relatively rapid loss of activity.

We have discovered a catalyst suitable for use in many organic reactions, which can be made from relatively inexpensive materials by a simple method of manufacture. Said catalyst consists of the oxygen-containing hydrocarbon complex of boron trifluoride.

In one embodiment our invention consists of a process for the manufacture of catalysts which comprises subjecting oxygen, boron trifluoride, and a hydrocarbon to a temperature and for a time sufficient to form an oxygen-containing hydrocarbon complex of boron trifluoride.

Our catalyst can be used in organic reactions such as the polymerization of normally gaseous olefins, the polymerization of normally liquid olefins, the alkylation of aromatic hydrocarbons, the alkylation of phenols, the alkylation of heterocyclic compounds such as indole, and in various types of condensation reactions such as the condensation of acetone to form higher boiling unsaturated ketones and aromatics.

Olefinic hydrocarbons utilizable in the processes in which our catalyst may be employed comprise monoolefins having one double bond per molecule and polyolefins having more than one double bond per molecule. Monoolefins, which may be polymerized or be utilized in alkylation reactions, are either normally gaseous or normally liquid and include ethylene, propylene, butylenes, amylenes, and higher normally gaseous olefins. Other olefinic hydrocarbons utilizable in these processes include conjugated diolefins such as butadiene and isoprene, and also nonconjugated diolefins and other polyolefinic hydrocarbons containing more than two double bonds per molecule.

The alkylation processes which may be carried out in the presence of our catalyst, may be effected by reacting the alkylatable compound with a substance capable of producing olefinic hydrocarbons under the conditions of operation chosen for the process. Such olefin producing substances include alcohols, ethers, and esters capable of undergoing dehydration or splitting to form olefinic hydrocarbons containing at least two carbon atoms per molecule.

Aromatic hydrocarbons such as benzene, toluene, other alkyl benzenes, naphthenes, alkyl naphthenes, other polynuclear aromatics, etc., which are alkylated by olefinic hydrocarbons as herein set forth, may be obtained from any source such as by the distillation of coal, by the dehydrogenation of naphthenic hydrocarbons, and by the dehydrogenation and cyclization of aliphatic hydrocarbons.

Our catalyst is made by interacting oxygen, or an oxygen-containing gas, with boron trifluoride and a hydrocarbon to form a brown, pasty, oxygen-containing hydrocarbon complex of boron trifluoride. A simple method of conducting this preparation is to charge a liquid hydrocarbon such as normal pentane to an autoclave, pressure the autoclave with air and boron trifluoride, and heat the mixture until reaction takes place. The temperature at which reaction takes place is indicated by a substantial drop in pressure. This temperature usually is higher than 150° C. After the heating has been conducted for a suitable length of time, generally a few hours, the autoclave is cooled, the pressure is released, and the catalyst is recovered. Since there are a number of different hydrocarbons, such as iso and normal paraffins, olefins, and the like which can be used, it is apparent that there are a number of alternative catalysts with somewhat different properties which can be prepared by our process. When aromatic hydrocarbons such as benzene are used, higher temperatures of the order of 350° C. must be used to bring about the reaction which produces the catalyst.

In organic reactions using the type of catalyst herein described, either batch or continuous operation may be employed. In a simple batch procedure, proportionate amounts of the organic compound and the catalyst may be added to a vessel, and the contents heated for a time adequate to cause the desired degree of conversion. After a period of heating, the reaction vessel may be cooled, the contents discharged, and a separation effected between the organic compound and the catalyst.

In continuous operation the catalyst, either alone or on carriers, may be placed in a reaction chamber, and the preheated stream of organic compound or compounds may be passed through the catalyst bed. The products from such a treatment may be continuously fractionated to separate the organic compounds from the catalyst.

The organic reactions described herein generally are carried out at temperatures of from about —20 to about 150° C. and under a pressure of from substantially atmospheric to approximately 100 atmospheres. In the alkylation reactions, it is preferred to have present from about 2 to about 40 molecular proportions of the alkylatable compound per 1 molecular proportion of the alkylating agent.

The following examples are given to illustrate the method of preparing the catalyst and the results obtained when using it in various organic reactions, although the data presented are not introduced with the intention of unduly restricting the generally broad scope of the invention.

Example I

A rotating autoclave was charged with 62 g. of normal pentane, 21 g. of boron trifluoride, and 1.43 mols of air. This charge had an initial pressure of 445 p. s. i. The autoclave was heated to 150° and while it was maintained at that temperature there was no decrease in pressure. After the autoclave was cooled to room temperature and opened, it was found that there was no solid material therein. The noncondensable gas evolved was found to contain 20% oxygen after being scrubbed with caustic solution. Apparently no oxygen had been reacted.

Example II

A mixture consisting of 62 g. of normal pentane, 13 g. of boron trifluoride, and 0.75 mol of air, was heated in an autoclave to 200° C. and maintained at that temperature for 13 hours. During this time the pressure dropped from 800 p. s. i. to 730 p. s. i. After cooling to room temperature, the following recovery was made: 0.61 mol of non-condensable gas, which analyzed pure nitrogen; 54 g. of liquid material, which analyzed normal pentane; and a considerable amount of unweighed heavy brown solid residue.

A comparison of the results obtained in the experiments given under Example I and under Example II shows that a temperature exceeding 150° C. was required to effect the reaction between air, normal pentane, and boron trifluoride.

Example III

After opening the autoclave in Example II, it was twice pressured with nitrogen and evacuated to free the solid substance from occluded boron trifluoride. It was then resealed and into it was charged 52 g. of propylene and 285 g. of benzene. The autoclave was then heated to 150° C. for 2 hours. After cooling to room temperature, the bomb was opened and the liquid product contained therein was removed and washed with water. Analysis of this material showed that its composition was as follows:

| | Grams |
|---|---|
| Benzene | 238 |
| Cumene | 60 |
| Diisopropylbenzene | 13 |
| Higher alkylate benzenes | 7 |

Accordingly, it must be concluded that the material formed by reacting boron fluoride, normal pentane, and air is a catalyst for the alkylation of benzene with propylene.

Example IV

Into an 850 cc. steel autoclave were charged 65 g. of normal pentane, 17 g. of boron trifluoride, and 0.77 mol of air. The autoclave was heated to 200° C. and maintained at that temperature for 12 hours. After cooling, the following products were found: 47 g. of liquid, 5 g. of condensable gas; 2 g. of boron trifluoride; 21 liters of noncondensable gas which analyzed 0.2% $O_2$, 1.0% $CO_2$, 3.2% paraffins, 8.3% $CO$, 9.7% $H_2$, and 77.6% $N_2$; and a quantity of brown, pasty oxygen-containing hydrocarbon complex of boron trifluoride. The autoclave was evacuated and purged with air twice to free the complex of occluded boron trifluoride.

Example V

The autoclave mentioned in the preceding example was resealed with the complex in it and to it was added 154 g. of isobutylene. The autoclave was heated at 100° C. for 1 hour. After the bomb was cooled and opened, it was found that 138 g. of polymer had been produced. The boiling point characteristics of this polymer were as follows:

| Fraction: | Weight per cent |
|---|---|
| Condensable Gas | 3 |
| 25–200° C | 33 |
| 200–240° C | 25 |
| 240° C | 39 |
| | 100 |

This experiment shows that the product made by reacting air, normal pentane, and boron fluoride catalyzed the polymerization of isobutylene at 100° C.

Example VI

The autoclave used in Example V was evacuated and, without removing the catalyst, 150 g. of isobutylene was added, whereupon the autoclave was rotated for 1 hour at room temperature. Upon opening the vessel, 129 g. of polymer with the following distillation characteristics was found.

| Fraction: | Weight per cent |
|---|---|
| Condensable Gas | 2 |
| 25–200° C | 43 |
| 200–240° C | 33 |
| 240° C | 22 |
| | 100 |

This experiment shows that the catalyst made according to our process is capable of polymerizing isobutylene at room temperature.

Example VII

The autoclave used in Example VI was evacuated without removing the catalyst and 150 g. of butene-2 was then added. The vessel was rotated for 1 hour at room temperature. There was no evidence of reaction so the autoclave was heated to 100° C. and maintained at that temperature for 7 hours. Upon cooling and opening the vessel, 150 g. of liquid was recovered. This material was distilled into the following fractions.

| Fraction: | Weight per cent |
|---|---|
| Condensable Gas | 2 |
| 25–200° C | 43 |
| 200–240° C | 33 |
| 240° C | 22 |
| | 100 |

Thus it can be seen that butene-2 was polymerized by our catalyst at 100° C.

The use of the same batch of catalyst in the three successive experiments given under Examples V, VI, VII, is an indication of the long life of our catalyst.

We claim as our invention:

1. A solid oxygen-containing hydrocarbon complex of boron trifluoride, said complex being the reaction product of oxygen, boron trifluoride, and a hydrocarbon at a temperature above about 150° C.

2. A solid oxygen-containing hydrocarbon complex of boron trifluoride, said complex being the reaction product of oxygen, boron trifluoride, and a paraffin at a temperature above about 150° C.

3. A solid oxygen-containing hydrocarbon complex of boron trifluoride, said complex being the reaction product of oxygen, boron trifluoride, and a pentane at a temperature above about 150° C.

4. A solid oxygen-containing hydrocarbon complex of boron trifluoride, said complex being the reaction product of oxygen, boron trifluoride, and normal pentane at a temperature above about 150° C.

5. A solid oxygen-containing hydrocarbon complex of boron trifluoride, said complex being the reaction product of oxygen, boron trifluoride, and an olefin at a temperature above about 150° C.

6. A solid oxygen-containing hydrocarbon complex of boron trifluoride, said complex being the reaction product of oxygen, boron trifluoride, and an aromatic hydrocarbon at a temperature above about 350° C.

7. A process which comprises subjecting boron trifluoride and a hydrocarbon to the action of oxygen at a temperature of at least about 150° C. for a time sufficient to form a solid oxygen-containing hydrocarbon complex of boron trifluoride.

8. The process of claim 7 further characterized in that said hydrocarbon comprises a paraffin.

9. The process of claim 7 further characterized in that said hydrocarbon comprises a pentane.

10. The process of claim 7 further characterized in that said hydrocarbon comprises normal pentane.

RICHARD C. WACKHER.
CARL B. LINN.

REFERENCES CITED

The following references are of record in the file of this patent:

UNITED STATES PATENTS

| Number | Name | Date |
|---|---|---|
| 2,447,975 | Croxall et al. | Aug. 24, 1948 |
| 2,448,660 | Croxall et al. | Sept. 7, 1948 |